United States Patent [19]

Okada

[11] Patent Number: 4,951,078
[45] Date of Patent: Aug. 21, 1990

[54] CAMERA SYSTEM INCLUDING CATADIOPTRIC LENS AND CATADIOPTRIC LENS SYSTEM USED THEREIN

[75] Inventor: Takashi Okada, Osaka, Japan

[73] Assignee: Minolta Camera Kabushiki Kaisha, Osaka, Japan

[21] Appl. No.: 352,170

[22] Filed: May 15, 1989

[30] Foreign Application Priority Data

May 16, 1988 [JP] Japan ................. 63-118611
May 16, 1988 [JP] Japan ................. 63-118612

[51] Int. Cl.⁵ ............................. G03B 13/00
[52] U.S. Cl. ..................... 354/402; 354/406; 354/408
[58] Field of Search ............... 354/402, 406, 407, 408, 354/227.1; 250/201 PF, 204

[56] References Cited

U.S. PATENT DOCUMENTS

| | | | |
|---|---|---|---|
| 4,165,151 | 8/1979 | Momiyama | 350/444 |
| 4,188,091 | 2/1980 | Fujii | 350/444 |
| 4,264,136 | 4/1981 | Ogino | 350/444 |
| 4,322,616 | 3/1982 | Fukuhara et al. | 354/402 |
| 4,370,551 | 1/1983 | Fujuhara et al. | 250/201 |
| 4,403,836 | 9/1983 | Mihara | 350/444 |
| 4,666,259 | 5/1987 | Iizuka | 350/444 |
| 4,794,416 | 12/1988 | Mukai et al. | 354/402 |

FOREIGN PATENT DOCUMENTS

| | | |
|---|---|---|
| 43-5951 | 3/1968 | Japan . |
| 47-1909 | 1/1972 | Japan . |
| 53-76830 | 7/1978 | Japan . |
| 55-38520 | 3/1980 | Japan . |
| 58-11913 | 1/1983 | Japan . |
| 58-169119 | 10/1983 | Japan . |

Primary Examiner—L. T. Hix
Assistant Examiner—David M. Gray
Attorney, Agent, or Firm—Price, Gess & Ubell

[57] ABSTRACT

The present invention provides a camera system including a camera body and a catadioptric lens mountable on the camera body, comprises a sensor provided in the camera body, for detecting a focusing condition of a lens mounted on the camera body, by detecting a distance of a pair of secondary images of an image formed by the lens and light shield, provided in the catadioptric lens, for determining both an outside diameter of an exit pupil of the catadioptric lens and an inside diameter thereof so that light bundles forming the pair of secondary images are passed through the exit pupil.

25 Claims, 9 Drawing Sheets

Pupil Position

CAMERA SYSTEM INCLUDING CATADIOPTRIC LENS AND CATADIOPTRIC LENS SYSTEM USED THEREIN

BACKGROUND OF THE INVENTION

1. Field of the Invention

The present invention relates to a camera system including a catadioptric lens, and more particular to a catadioptric lens system suitable for a single lens reflex camer having an automatic focus detection device.

2. Description of the Prior Art

A plurality of kinds of automatic focusing cameras of single a lens reflex type have been proposed. A plurality of types of automatic focus detection devices have been also proposed. The proposed automatic focus detection devices are classified into an active type automatic focus detection device and a passive type automatic focus detection device. The passive type automatic focus detection device is further classified in details into a contrast detection type and a phase difference detection type. The principle of the contrast detection type automatic focus detection device is to detect the sharpness of an image formed by a photographic lens for finding an in-focus condition of the photographic lens. It has a disadvantage that the detectable range of defocus amount is relatively narrow, although it has an advantage that the in-focus condition of the photographic lens can be detected regardless of the F-number thereof. On the other hand, the principle of the phase difference detection type automatic focus detection device is to detect a distance of two secondary images of an image formed by the photographic lens. It has an advantage that the detectable range of defocus amount is relatively wide in comparison with the former contrast detection type automatic focus detection device, although it has an disadvantage that the focus detection thereby is impossible with respect to a photographic lens having a larger F-number beyond a predetermined value. Therefore, the phase difference detection type automatic focus detection device can not be used for detecting a focusing condition of a catadioptric lens having a relatively large F-number.

The reason will be explained in details below. FIG. 1 shows a construction of an optical system used in a conventional phase difference detection type automatic focus detection device. In FIG. 1, an automatic focus detection module AFS, provided in a camera body, comprises a pair of separator lenses 2 for forming two secondary images of an image formed by a photographic lens TL on a charge coupled device (CCD) 4, and the focusing condition of the photographic lens TL with respect to an object located on an optical axis of the photographic lens TL is detected by detecting the distance between the two secondary images. Here, the configuration of light bundles incident on the CCD 4 with respect to an exit pupil plane thereof is shown in FIG. 2. In FIG. 2, EP represents a configuration of the exit pupil of the photographic lens TL, and $A_1$ and $A_2$ represent areas through which light rays pass for forming the secondary images on the CCD 4, respectively. The areas $A_1$ and $A_2$ are called "incident pupil" of the automatic focus detection module AFS hereinafter.

If the exit pupil EP of the photographic lens TL is small in comparison with the incident pupil $A_1$ and $A_2$ of the automatic focus detection module AFS as shown in FIG. 3, the automatic focus detection module AFS can not receives sufficient light through the photographic lens TL for forming the secondary images of sufficient intensity of light. Therefore, the correct detection of the focusing condition of the photographic lens TL may be impossible Therefore, it is necessary to restrict the F-number of the photographic lens to which the focusing condition can be detected by the phase difference detection type automatic focus detection device.

Furthermore, such restriction should be more severe with respect to a catadioptric lens system. Namely, an exit pupil EPr of the catadioptric lens system forms a ring shape as shown in FIG. 4, and therefore a light ray does not pass through the central portion near the optical axis on the exit pupil plane of the catadioptric lens system.

SUMMARY OF THE INVENTION

An object of the present invention is to provide a camera system including a catadioptric lens and a camera body in which the focusing condition of the catadioptric lens can be detected by a phase difference detection type automatic focus detection device provided in the camera body.

The other object of the present invention is to provide the camera system without deteriorate the aberration corrections generated by the catadioptric lens.

The other object of the present invention is to provide a catadioptric lens system with respect to which the focusing condition thereof can be detected by the above-explained phase difference detection type automatic focus detection device.

The other object of the present invention is to provide a catadioptric lens system in which the exit pupil thereof covers therein the incident pupil of the automatic focus detection module AFS defined above.

Further other object of the present invention is to provide a catadioptric lens system in which the exit pupil thereof has a configuration which does not shield the incident pupil of the automatic focus detection module AFS.

Further other object of the present invention is to provide a catadioptric lens system in which the light to be received by the automatic focus detection module AFS is not shielded in the lens system.

To achieve the above objects, according to the present invention, a camera system including a camera body and a catadioptric lens mountable on the camera body, comprises: means, provided in the camera body, for detecting a focusing condition of a lens mounted on the camera body, by detecting a distance of a pair of secondary images of an image formed by the lens; and means, provided in the catadioptric lens, for determining both an outside diameter of an exit pupil of the catadioptric lens and an inside diameter thereof so that light bundles forming the pair of secondary images are passed through the exit pupil.

To achieve the above objects, according to the present invention, a catadioptric lens system mountable on the camera body which includes a focus detection device for detecting a focusing condition of a lens mounted on the camera body by detecting a distance of a pair of secondary images of an image formed by the lens along a predetermined direction, comprises: means for determining both an outside diameter of an exit pupil of the catadioptric lens and an inside diameter thereof so that light bundles forming the pair of secondary images are passed through the exit pupil.

DETAILED DESCRIPTION OF THE PREFERRED EMBODIMENTS

Figure 1:
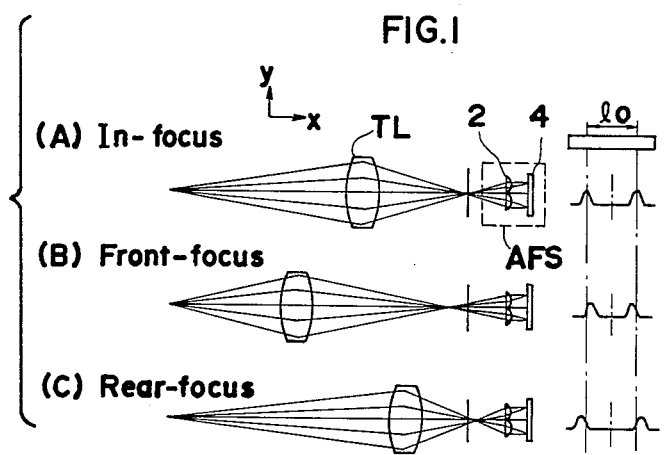
FIG. 1 represents a schematic view of a phase difference detection type automatic focus detection device.
Figure 2:
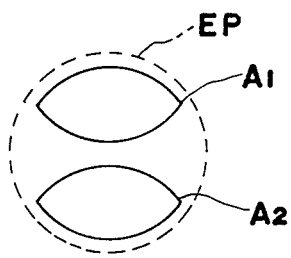
FIG. 2 represents a relation between the incident pupil of the automatic focus detection module AFS and an exit pupil EP of a photographic lens with respect to which the focusing condition thereof can be detected by the phase difference detection type automatic focus detection device.
Figure 3:
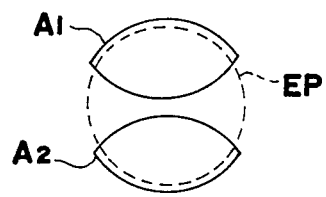
FIG. 3 represents a relation between the incident pupil of the automatic focus detection module AFS and an exit pupil EP of a photographic lens with respect to which the focusing condition thereof can not be detected by the phase difference detection type automatic focus detection device.
Figure 4:
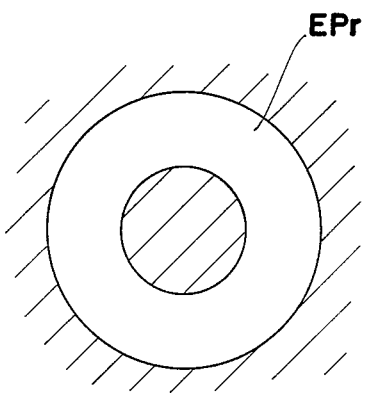
FIG. 4 represents a configuration of an exit pupil of a catadioptric lens system.

The following description is provided to enable any person skilled in the optical and camera field to make and use the invention and sets forth the best modes contemplated by the inventors for carrying out their invention. Various modifications, however, will remain readily apparent to those skilled in the art, since the generic principles of the present invention have been defined herein specifically to provide a relatively economical and easily manufactured compact catadioptric lens system. The derivation of the formulas and the relation of the powers set forth herein can be accomplished with the assistance of a computer. The present invention represents the parameters of a compromise balance of acceptable aberrations which can be relatively easily manufactured to provide a low cost catadioptric lens system. In the drawings, schematic cross sectional views disclose the position of the lens groups and the lens elements in the infinity focusing condition.

A camera system, including a camera body and a catadioptric lens mountable on the camera body according to the present invention, comprises: means, provided in the camera body, for detecting a focusing condition of a lens mounted on the camera body, by detecting a distance of a pair of secondary images of an image formed by the lens; and means, provided in the catadioptric lens, for determining both an outside diameter of an exit pupil of the catadioptric lens and an inside diameter thereof so that light bundles forming the pair of secondary images are passed through the exit pupil.

According to a first approach of the present invention, the catadioptric lens includes a catadioptric lens system fulfilling the following conditions:

(1) $5.5 \leq F_{NO(OUT)} \leq 7.5$ (2) $15 \leq F_{NO(IN)} \leq 20$ wherein: $F_{NO}(\text{OUT})$ represents F-number of the lens system corresponding to the outside shape of the exit pupil; and $F_{NO}(\text{IN})$ represents F-number of the lens system corresponding to the inside shape of the exit pupil.

Figure 6:
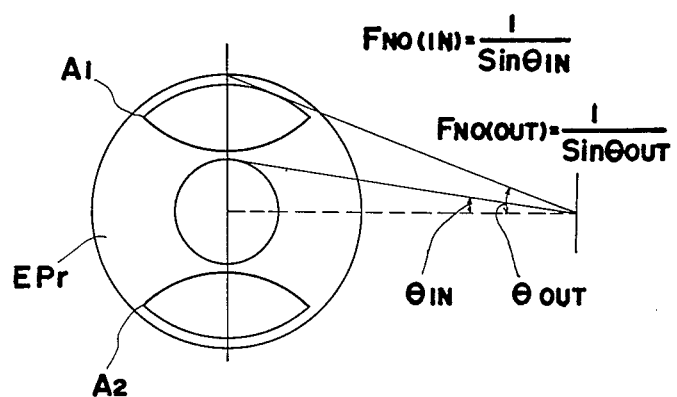
FIG. 6 represents a schematic diagram showing the configuration of the exit pupil of the catadioptric lens system of a first embodiment according to the first approach of the present invention.

The first approach of the present invention is based on a consideration in which the configuration of the exit pupil EPr of the catadioptric lens system should be determined to cover the incident pupil $A_1$ and $A_2$ of the automatic focus detection module AFS as shown in FIG. 6. Conditions (1) and (2) are defined for realizing the above consideration. The exit pupil EPr of the catadioptric lens system can cover the incident pupil $A_1$ and $A_2$ of the automatic focus detection module AFS as shown in FIG. 6, if both of conditions (1) and (2) are fulfilled, and therefore, the focusing condition of the photographic lens system can be detected by the phase difference detection type automatic focus detection device.

Conditions (1) and (2) will be explained in detail below. If the upper limit of conditions (1) is violated, the outside diameter of the exit pupil of the catadioptric lens system is undersirable decreased so that the outside edge of the exit pupil of the catadioptric lens system interrupts the light to be received by the automatic focus detection module AFS. Contrary, if the lower limit of condition (1) is violated, it becomes difficult to prevent the inside edge of the exit pupil from interrupting the light to be received by the automatic focus detection module AFS, since the inside diameter of the exit pupil of the catadioptric lens system is undesirable increased in accordance with the increase of the outside diameter.

If the upper limit of condition (2) is violated the outside diameter of the exit pupil of the catadioptric lens system is undesirable decreased in accordance with the decrease of the inside diameter thereof so that the outside edge of the exit pupil of the catadioptric lens system interrupts the light to be received by the automatic focus detection module AFS by the outside limit of the exit pupil. Contrary, if the lower limit of condition (2) is violated, the inside diameter of the exit pupil of the catadioptric lens system is undesirable increased so that the inside edge of the exit pupil of the catadioptric lens system interrupts the light to be received by the automatic focus detection module AFS by the outside limit of the exit pupil.

In other words, in the catadioptric lens system, both the outside and inside diameters of the exit pupil thereof should be limited, since the light coming from an object has been reflected on the main mirror to the sub-mirror located at the object side of the main mirror. Therefore, the increase of the outside diameter of the exit pupil of the catadioptric lens system causes the increase of the inside diameter thereof, and on the other hand, the decrease of the inside diameter of the exit pupil of the catadioptric lens system causes the decrease of the outside diameter thereof. Thus, the outside and inside diameters of the exit pupil of the catadioptric lens system should be determined not to prevent both of the outside and inside edges of the exit pupil from shielding light to be received by the automatic focus detection module AFS. The first approach of the present invention is characterized by determining the outside and inside diameters of the exit pupil of the catadioptric lens system along the conditions (1) and (2) not to prevent body of the outside and inside edges of the exit pupil from shielding light to be received by the phase difference detection type automatic focus detection device.

In the first approach of the present invention, the parameters $F_{NO}(OUT)$, $F_{NO}(IN)$ defined in condition (1) and (2) represent a maximum effective F-number for light emitted from the exit pupil of the catadioptric lens system, and a minimum effective F-number therefor, respectively as shown in FIG. 6.

In the first approach of the present invention, it is further desirable to fulfill the following conditions in order to improve the focusing condition detection accuracy:

(3) $100 \text{ mm} \leq P_U(OUT) \leq 150 \text{ mm}$
(4) $100 \text{ mm} \leq P_U(IN) \leq 150 \text{ mm}$ wherein: $P_U(OUT)$ represents a distance between a focal plane of the lens system and an intersection on which an optical axis of the lens system intersects a principal ray which passes through an outside limit of the exit pupil to a focal position having an image height of 2.0 mm; and $P_U(IN)$ represents a distance between the focal plane of the lens system and an intersection on which the optical axis of the lens system intersects a principal ray which passes through an inside limit of the exit pupil to the focal position having the image height of 2.0 mm.

Figure 7:
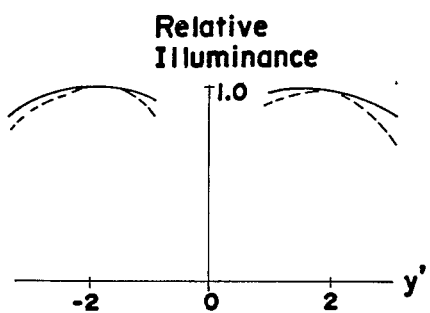
FIG. 7 represents a graph showing the distribution of illuminance on the CCD provided in the automatic focus detection module.

In the phase difference detection type automatic focus detection device, the focusing condition of the photographic lens is detected in accordance with the distribution of illuminance on the CCD, and therefore the CCD has an area having a slight extent. If the brightness of the object is constant, the illuminance on the CCD with respect to an object having a constant brightness should be constant in a ideal condition as shown by the real line in FIG. 7. If the illuminance on the CCD with respect to an object having a constant brightness is vignetted as shown by a dotted line of FIG. 7, the focusing condition detection accuracy is deteriorated thereby.

Figure 8:
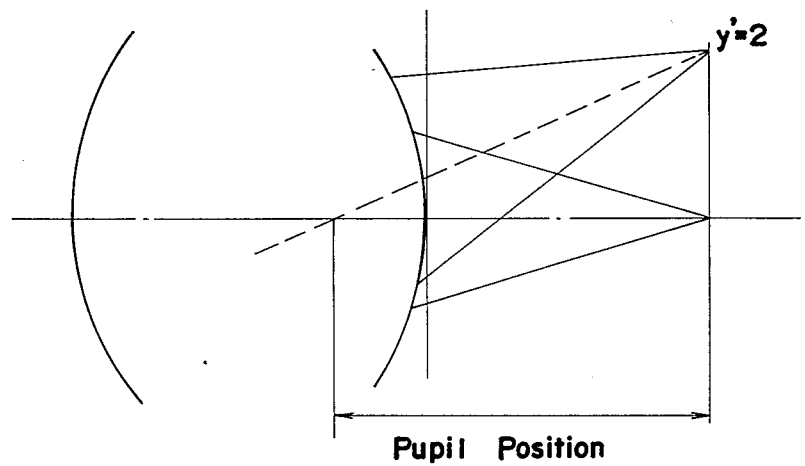
FIG. 8 represents a schematic diagram showing the definition of the exit pupil position according to a first approach of the present invention.

Therefore, the position of the exit pupil of the catadioptric lens system causes a problem for removing such deterioration. The area of the CCD corresponds an area having an extent on the exit pupil plane of the catadioptric lens system. Then, in the present invention, the position of the exit pupil of the catadioptric lens system is defined as shown in FIG. 8. Namely, the position of the exit pupil of the catadioptric lens system is defined by using a distance between a focal plane of the lens system and an intersection on which an optical axis of the lens system intersects a principal ray which passes through the outside and inside edges of the exit pupil to a focal position having an image height of 2.0 mm. The intersection on which an optical axis of the lens system intersects a principal ray which passes through the outside edge of the exit pupil to a focal position having an image height of 2.0 mm is defined as the position of the exit pupil with respect to the outside diameter thereof, regardless of the inside diameter thereof. Therefore, the distance between the intersection and the film plane is defined as an exit pupil distance $P_U(OUT)$ with respect to the outside diameter thereof. An exit pupil distance $P_U(IN)$ with respect to the inside diameter thereof is similarly defined by decreasing the above defined exit pupil distance $P_U(OUT)$ with respect to the outside diameter thereof.

Figure 5:
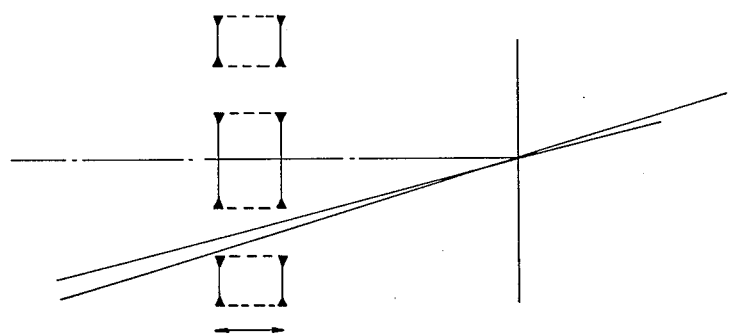
FIG. 5 represents a schematic diagram showing the change of the exit pupil position of the catadioptric lens system during the focusing operation thereof.

The position of the exit pupil of the catadioptric lens system is changed in accordance with the focusing condition thereof as shown in FIG. 5. Therefore, it is necessary to prevent from shielding any light to be received by the automatic focus detection module AFS taking the change of the position of the exit pupil of the catadioptric lens system during the focusing operation thereof into consideration. This is realized by fulfilling conditions (3) and (4). If either of the conditions (3) and (4) is violated, it becomes difficult or impossible to maintain a sufficient accuracy of the focusing condition detection since the light to be received by the automatic focus detection module AFS is shielded by the catadioptric lens system.

Figure 9:
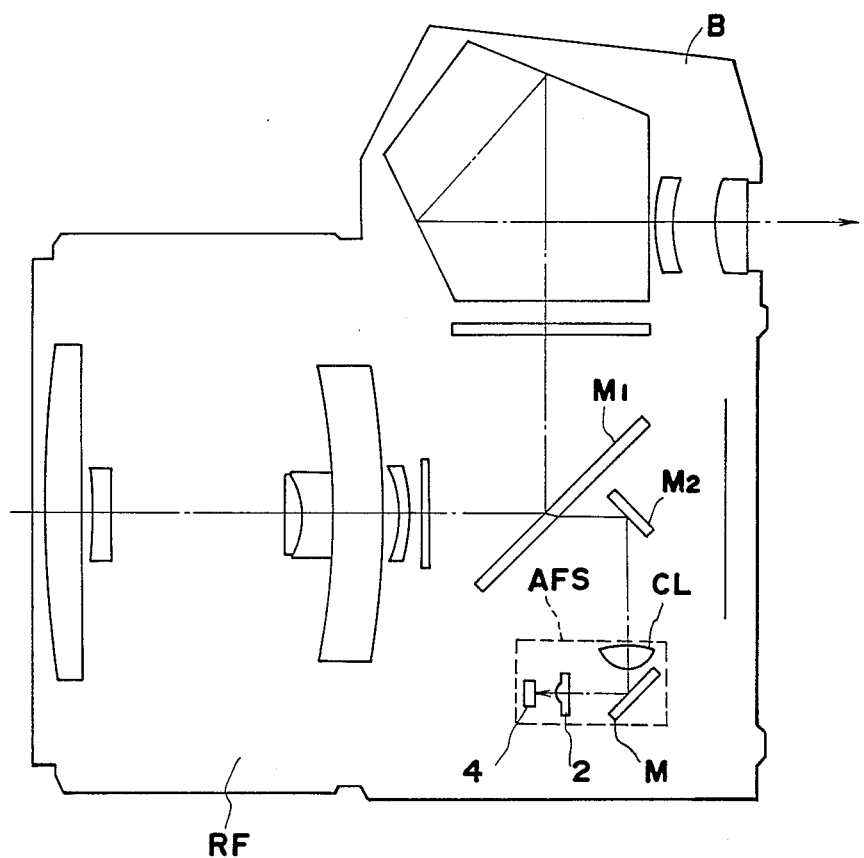
FIG. 9 represents a schematic cross-sectional view of the camera system according to the present invention.
Figure 10:
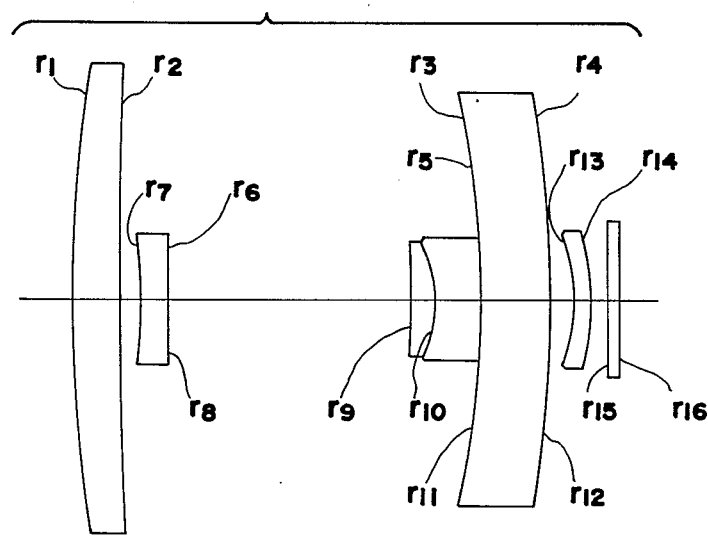
FIG. 10 represents a cross-sectional view of a catadioptric lens system of a first embodiment according to the first approach.
Figure 11:
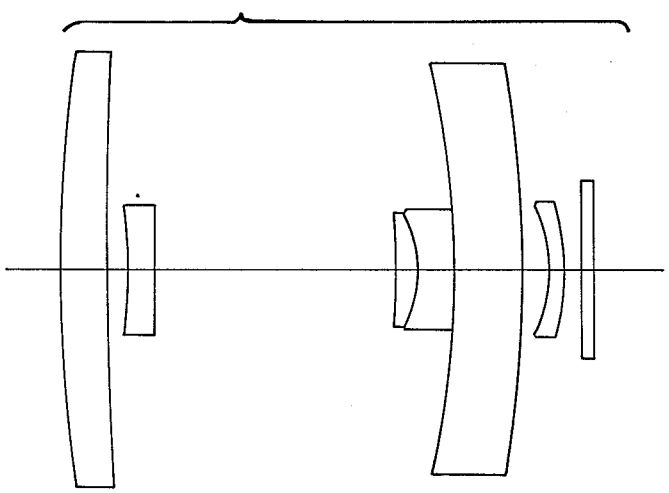
FIG. 11 represents a cross-sectional view of the catadioptric lens system of a second embodiment according to the first approach.
Figure 12:
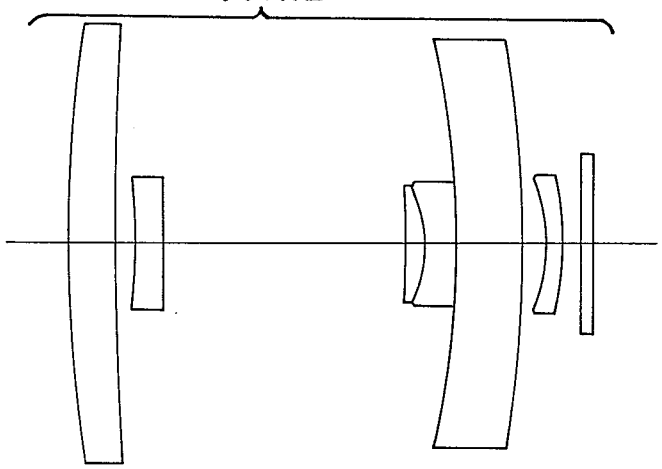
FIG. 12 represents a cross-sectional view of the catadioptric lens system of a third embodiment according to the first approach.

FIG. 9 represents the catadioptric lens system, according to the first approach of the present invention, mounted on a camera body having a phase difference detection type automatic focus detection device. In FIG. 9, RF represents the catadioptric lens mountable on a single lens reflex camera body B. The catadioptric lens includes a catadioptric lens system therein. The light transmitted through the catadioptric lens RF and a reflex mirror $MR_1$ is reflected on an auxiliary mirror $MR_2$. The light reflected on the auxiliary mirror $MR_2$ is converged by a condenser lens CL provided in the automatic focus detection module AFS, and thereafter is reflected on a mirror M. The light reflected on the mirror M is incident on the CCD 4 through a pair of separator lenses 2 to form, on the CCD 4, a pair of secondary images of an image formed by the catadioptric lens RF. The focusing condition of the catadioptric lens RF with respect to an object located on the optical axis thereof can be detected by detecting a distance between the pair of secondary images formed on the CCD 4. The catadioptric lens RF according to the first approach of the present invention never shields the light to be received by the CCD 4 provided in the automatic focus detection module AFS, and therefore the accurate automatic focus detection is possible.

The following TABLES 1 to 3 disclose, respectively, the catadioptric lens system of the first through third embodiments according to the first approach of the present invention. In the Tables, f represents the focal length of the whole lens system, $F_{NO}$ represents the F-number of the whole lens system, r is the radius of curvature with respective sub number indicating the surfaces numbered in the order of the transmission of the light ray, d represents the axial distance and includes both air spaces and the actual thickness of the lens elements along the optical axis, N equals the refractive index and again, the sub numbers refer to the particular optical element numbered in the order of the transmission of the light ray, and finally, v equals the Abbe number and the sub numbers refer to the specific lens elements numbered in the order of the transmission of the light ray. Inside effective diameter on $r_2$ shown in the TABLES represents the inside diameter of the exit pupil of the catadioptric lens system.

TABLE 1

[Embodiment 1]
f = 496.0    $F_{NO}$ = 7.0

| Radius of Curvature | | Axial Distance | | Refractive Index (Nd) | | Abbe Number (d) | |
|---|---|---|---|---|---|---|---|
| $r_1$ | 273.895 | | | | | | |
| | | $d_1$ | 8.1 | $N_1$ | 1.5168 | 1 | 64.20 |
| $r_2$ | 1765.069 | | | | | | |
| | | $d_2$ | 60.8 | | | | |
| $r_3$ | −168.580 | | | | | | |
| | | $d_3$ | 11.7 | $N_2$ | 1.6700 | 2 | 57.07 |
| $r_4$ | −204.757 | | | | | | |
| | | $d_4$ | −11.7 | $N_3$ | 1.6700 | 3 | 57.07 |
| $r_5$ | −168.580 | | | | | | |
| | | $d_5$ | −52.9 | | | | |
| $r_6$ | −560.818 | | | | | | |
| | | $d_6$ | −4.7 | $N_4$ | 1.5168 | 4 | 64.20 |
| $r_7$ | −104.503 | | | | | | |
| | | $d_7$ | 4.7 | $N_5$ | 1.5168 | 5 | 64.20 |
| $r_8$ | −560.818 | | | | | | |
| | | $d_8$ | 41.2 | | | | |
| $r_9$ | −232.291 | | | | | | |
| | | $d_9$ | 4.2 | $N_6$ | 1.7130 | 6 | 53.93 |
| $r_{10}$ | −21.573 | | | | | | |
| | | $d_{10}$ | 7.5 | $N_7$ | 1.5168 | 7 | 64.20 |
| $r_{11}$ | −168.580 | | | | | | |
| | | $d_{11}$ | 11.7 | $N_8$ | 1.6700 | 8 | 57.07 |
| $r_{12}$ | −204.757 | | | | | | |
| | | $d_{12}$ | 4.5 | | | | |
| $r_{13}$ | −23.966 | | | | | | |
| | | $d_{13}$ | 2.5 | $N_9$ | 1.6700 | 9 | 57.07 |
| $r_{14}$ | −39.520 | | | | | | |
| | | $d_{14}$ | 2.7 | | | | |
| $r_{15}$ | inf. | | | | | | |
| | | $d_{15}$ | 2.0 | $N_{10}$ | 1.5168 | 10 | 64.20 |
| $r_{16}$ | inf. | | | | | | | d = 92.3
Inside effective diameter on $r_2$ = 13.5
$F_{NO(OUT)}$ = 6.59    $F_{NO(IN)}$ = 18.20
$P_{U(OUT)}$ = 129 mm    $P_{U(IN)}$ = 143 mm

TABLE 2

[Embodiment 2]
f = 496.0    $F_{NO}$ = 7.5

| Radius of Curvature | | Axial Distance | | Refractive Index (Nd) | | Abbe Number (d) | |
|---|---|---|---|---|---|---|---|
| $r_1$ | 249.501 | | | | | | |
| | | $d_1$ | 8.1 | $N_1$ | 1.5168 | 1 | 64.20 |
| $r_2$ | 1154.414 | | | | | | |
| | | $d_2$ | 58.9 | | | | |
| $r_3$ | −162.854 | | | | | | |
| | | $d_3$ | 11.5 | $N_2$ | 1.6700 | 2 | 57.07 |
| $r_4$ | −196.748 | | | | | | |
| | | $d_4$ | −11.5 | $N_3$ | 1.6700 | 3 | 57.07 |
| $r_5$ | −162.854 | | | | | | |
| | | $d_5$ | −51.0 | | | | |
| $r_6$ | −854.372 | | | | | | |
| | | $d_6$ | −4.7 | $N_4$ | 1.5168 | 4 | 64.20 |
| $r_7$ | −98.776 | | | | | | |
| | | $d_7$ | 4.7 | $N_5$ | 1.5168 | 5 | 64.20 |
| $r_8$ | −854.372 | | | | | | |
| | | $d_8$ | 41.0 | | | | |
| $r_9$ | −302.309 | | | | | | |
| | | $d_9$ | 4.0 | $N_6$ | 1.7130 | 6 | 53.93 |
| $r_{10}$ | −20.616 | | | | | | |
| | | $d_{10}$ | 6.0 | $N_7$ | 1.5168 | 7 | 64.20 |
| $r_{11}$ | −162.854 | | | | | | |
| | | $d_{11}$ | 11.5 | $N_8$ | 1.6700 | 8 | 57.07 |
| $r_{12}$ | −196.748 | | | | | | |
| | | $d_{12}$ | 4.5 | | | | |
| $r_{13}$ | −23.030 | | | | | | |
| | | $d_{13}$ | 2.5 | $N_9$ | 1.6700 | 9 | 57.07 |
| $r_{14}$ | −39.021 | | | | | | |
| | | $d_{14}$ | 2.7 | | | | |
| $r_{15}$ | inf. | | | | | | |
| | | $d_{15}$ | 2.0 | $N_{10}$ | 1.5168 | 10 | 64.20 |
| $r_{16}$ | inf. | | | | | | | d = 90.2
Inside effective diameter on $r_2$ = 14.5
$F_{NO(OUT)}$ = 6.80    $F_{NO(IN)}$ = 16.93
$P_{U(OUT)}$ = 141 mm    $P_{U(IN)}$ = 141 mm

TABLE 3

[Embodiment 3]
f = 496.0    $F_{NO}$ = 7.5

| Radius of Curvature | | Axial Distance | | Refractive Index (Nd) | | Abbe Number (d) | |
|---|---|---|---|---|---|---|---|
| $r_1$ | 233.803 | | | | | | |
| | | $d_1$ | 8.1 | $N_1$ | 1.5168 | 1 | 64.20 |
| $r_2$ | 896.186 | | | | | | |
| | | $d_2$ | 58.2 | | | | |
| $r_3$ | −160.568 | | | | | | |
| | | $d_3$ | 11.5 | $N_2$ | 1.6700 | 2 | 57.07 |
| $r_4$ | −193.230 | | | | | | |
| | | $d_4$ | −11.5 | $N_3$ | 1.6700 | 3 | 57.07 |
| $r_5$ | −160.568 | | | | | | |
| | | $d_5$ | −50.3 | | | | |
| $r_6$ | −1991.357 | | | | | | |
| | | $d_6$ | −4.7 | $N_4$ | 1.5168 | 4 | 64.20 |
| $r_7$ | −95.769 | | | | | | |
| | | $d_7$ | 4.7 | $N_5$ | 1.5168 | 5 | 64.20 |
| $r_8$ | −1991.357 | | | | | | |
| | | $d_8$ | 41.0 | | | | |
| $r_9$ | −375.201 | | | | | | |
| | | $d_9$ | 3.8 | $N_6$ | 1.7130 | 6 | 53.93 |
| $r_{10}$ | −20.280 | | | | | | |
| | | $d_{10}$ | 5.5 | $N_7$ | 1.5168 | 7 | 64.20 |
| $r_{11}$ | −160.568 | | | | | | |
| | | $d_{11}$ | 11.5 | $N_8$ | 1.6700 | 8 | 57.07 |
| $r_{12}$ | −193.230 | | | | | | |
| | | $d_{12}$ | 4.5 | | | | |
| $r_{13}$ | −22.689 | | | | | | |
| | | $d_{13}$ | 2.5 | $N_9$ | 1.6700 | 9 | 57.07 |
| $r_{14}$ | −38.241 | | | | | | |
| | | $d_{14}$ | 2.7 | | | | |
| $r_{15}$ | inf. | | | | | | |
| | | $d_{15}$ | 2.0 | $N_{10}$ | 1.5168 | 10 | 64.20 |
| $r_{16}$ | inf. | | | | | | | d = 89.5
Inside effective diameter on $r_2$ = 15.0
$F_{NO(OUT)}$ = 6.80    $F_{NO(IN)}$ = 16.35

TABLE 3-continued

[Embodiment 3]

f = 496.0   $F_{NO}$ = 7.5

| Radius of Curvature | Axial Distance | Refractive Index (Nd) | Abbe Number (d) |
| --- | --- | --- | --- |
| $P_{U(OUT)}$ = 143 mm | | $P_{U(IN)}$ = 143 mm | |

Next, a second approach of the present invention will be explained.

The second approach of the present invention is based on a consideration to extend the shape of the exit pupil of the catadioptric lens only along a predetermined direction along which the distance between two secondary images of an image formed by the mounted lens is detected by the phase difference detection type automatic focus detection device for detecting the focusing condition thereof.

Thus, according to the second approach of the present invention, a catadioptric lens system mountable on a camera body having a focus detection device for detecting a focusing condition of a mounted lens by detecting a distance between two secondary images of an image formed by the mounted lens along a predetermined direction, comprises means for forming the exit pupil of the catadioptric lens so as to be extended along the predetermined direction.

Figure 13:
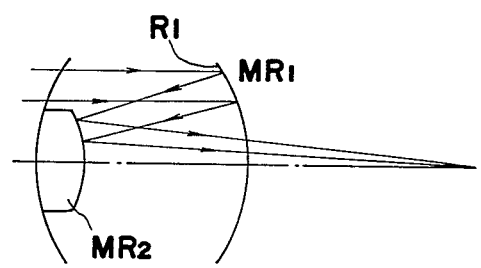
FIG. 13 represents a schematic cross sectional view of a catadioptric lens system of a fourth embodiment according to a second approach of the present invention.
Figure 14:
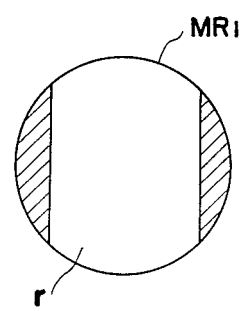
FIG. 14 represents a configuration of the reflecting surface of the main mirror of the fourth embodiment according to the second approach.
Figure 15:
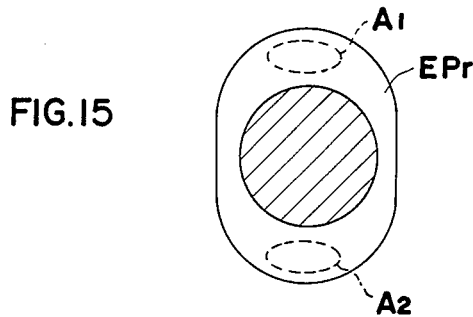
FIG. 15 represents a configuration of the exit pupil of the catadioptric lens system of the fourth embodiment according to the second approach.

A fourth embodiment according to the second approach of the present invention is shown in FIGS. 13 to 15. A fourth embodiment is characterized by defining the exit pupil of the catadioptric lens system to an ellipsoidal ring shape extending along the predetermined direction along which the distance between two secondary images of an image formed by the mounted lens is detected by the phase difference detection type automatic focus detection device for detecting the focusing condition thereof. In the conventional catadioptric lens system as schematically shown in FIG. 13, the light coming from an object to be focused is reflected on a reflecting surface $R_1$ of the main mirror $MR_1$, and thereafter is reflected on the sub-mirror $MR_2$. The reflecting surface $R_1$ of the main mirror $MR_1$ is made of a thin silver layer for reflecting light. The shape of the reflecting surface $R_1$ is determined by the shape of the silver layer which is evaporated in vacuum on the surface $R_1$. According to the fourth embodiment of the second approach of the present invention, the shape of the silver layer is represented by r shown in FIG. 14. As represented in FIG. 14, the shape r of reflecting surface $R_1$ of the main mirror $MR_1$ is defined as extending a predetermined direction along which the distance between two secondary images of an image formed by the mounted lens is detected by the phase difference detection type automatic focus detection device for detecting the focusing condition thereof. The shape of the silver layer can be controlled by controlling the shape of a mask which is covered on the surface in the evaporation of the silver layer. The shape of the exit pupil of the fourth embodiment is shown in FIG. 15. As shown in FIG. 15, the exit pupil of the catadioptric lens system forms an ellipsoidal ring shape extending along the predetermined direction along which the distance between two secondary images of an image formed by the mounted lens is detected by the phase difference detection type automatic focus detection device for detecting the focusing condition thereof. Namely, according to the fourth embodiment according to the second approach of the present invention, the outside diameter of the exit pupil of the catadioptric lens system along the predetermined direction is extended while keeping the inside diameter thereof along the predetermined direction.

According to the fourth embodiment of the second approach of the present invention as shown in FIGS. 13 to 15, it becomes possible to detect the focusing condition of the catadioptric lens system by the phase difference detection type automatic focus detection device, since the shape of the exit pupil of the catadioptric lens system is defined not to prevent light to be received by the automatic focus detection module AFS from being shielded by the exit pupil of the catadioptric lens system. Furthermore, since the shape of the exit pupil of the catadioptric lens system is extended only along the predetermined direction, any aberrations can be corrected well in comparison with the extension of the exit pupil along all directions.

Here, the shape of the exit pupil of the catadioptric lens system may not be limited to the ellipsoidal ring shape of the fourth embodiment according to the second approach of the present invention, and many modification are available. Furthermore, the shape of the exit pupil can be defined by determining the shape of a reflecting surface of the sub-mirror $MR_2$.

Figure 16:
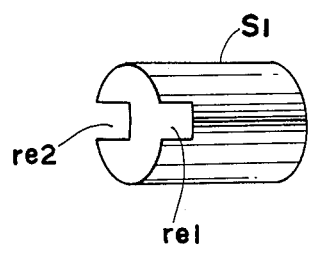
FIG. 16 represents a perspective view of a light shielding member of a catadioptric lens system of a fifth embodiment according to the second approach.
Figure 17:
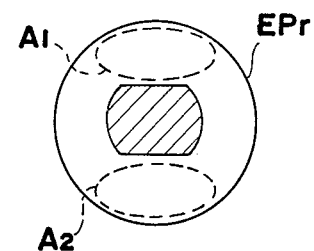
FIG. 17 represents a schematic cross sectional view of a catadioptric lens system of a fifth embodiment according to the second approach.

FIGS. 16 and 17 represent the fifth embodiment according to the second approach of the present invention. FIG. 16 represents a perspective view of a light shielding member $S_1$ positioned on a central portion of the main mirror $MR_1$ for shielding light passes out of the sub-mirror $MR_2$ from being directly incident on a film plane. As shown in FIG. 16, a pair of recesses $re_1$ and $re_2$ extending along the optical axis are formed on the light shielding member $S_1$ on the position corresponding to the incident pupil $A_1$ and $A_2$ of the automatic focus detection module AFS respectively for decreasing the inside diameter of the exit pupil only along the predetermined direction. FIG. 17 represents the relation between the incident pupil $A_1$ and $A_2$ of the automatic focus detection module AFS and the exit pupil EPr of the catadioptric lens system of the fifth embodiment according to the second approach of the present invention. The length of the light shielding member $S_1$ along the optical axis should be extended as long as possible for preventing light passed out of the sub-mirror $MR_2$ from being directly incident on the film plane, except for the pair of recesses. Namely, the fifth embodiment according to the second approach of the present invention is characterized by decreasing the inside diameter of the exit pupil of the catadioptric lens system for preventing the light to be received by the automatic focus detection module AFS from being shielded by the exit pupil of the catadioptric lens system. According to the fifth embodiment according to the second approach of the present invention, the focusing condition of the catadioptric lens system can be detected by the phase difference detection type automatic focus detection device, since the light to be received by the automatic focus detection module AFS is never shielded by the light shielding member $S_1$. Furthermore, since the shape of the exit pupil of the catadioptric lens system is extended only along the predetermined direction, any aberrations can be corrected well in comparison with the extension of the exit pupil along all directions.

In other words, the second approach of the present invention is characterized by limiting the, through which light bundles forming the pair of secondary images of the image formed by the catadioptric lens system pass, to have a cross-sectional shape extended along a predetermined direction along which the distance between the pair of secondary images is detected for detecting the focusing condition of the catadioptric lens system.

FIG. 9 also represents the catadioptric lens system, according to the second approach of the present invention, mounted on a camera body having a phase difference detection type automatic focus detection device.

Figure 18:
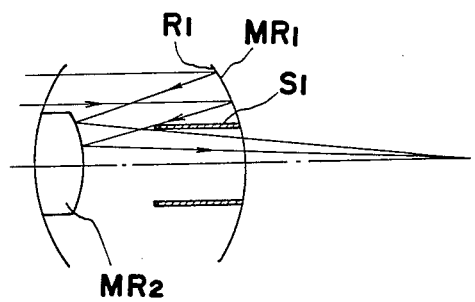
FIG. 18 represents a schematic front view of a catadioptric lens system of a sixth embodiment according to the second approach.
Figure 19:
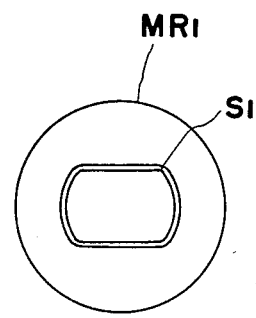
FIG. 19 represents a configuration of the exit pupil of the catadioptric lens system of the sixth embodiment according to the second approach.

FIGS. 18 and 19 represent a sixth embodiment according to the second approach of the present invention. In the sixth embodiment, the light shielding member $S_1$ is formed by a cylinder having an ellipsoidal cross-section extending along the predetermined direction without providing the pair of recesses, although it is more easy for manufacturing the light shielding member to provide the pair of recesses in a cylinder having a circular cross-section as in the fifth embodiment. The shape of the exit pupil of the catadioptric lens system of the sixth embodiment is similar to that of the fifth embodiment as shown in FIG. 17.

Finally, a third approach of the present invention will be explained. According to the third approach of the present invention, a catadioptric lens system, mountable on a camera body having a focus detection device for detecting a focusing condition of a mounted lens by receiving light which has passed through the mounted lens, comprises in the order of the transmission of a light ray in the system: a main mirror element having a first reflecting surface concave to the object side; a sub-mirror element having a second reflecting surface convex to the image side; and wherein the second reflecting surface is constructed so as to permit transmission of light which is detectable by the focus detection device with reflecting light contributing an exposure of a film.

Figure 20:
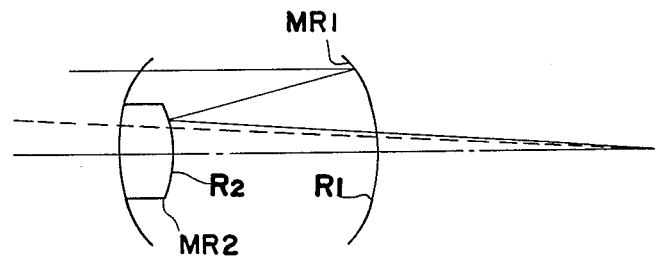
FIG. 20 represents a schematic cross sectional view of a catadioptric lens system of a seventh embodiment according to a third approach of the present invention.
Figure 21:
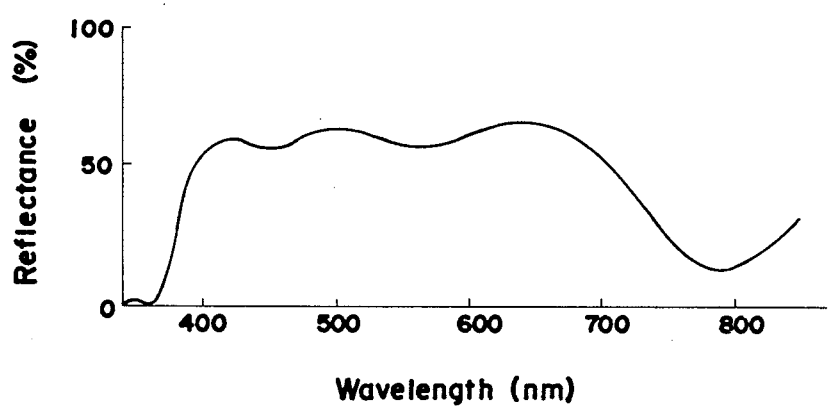
FIG. 21 represents a spectral characteristic of the coating applied to both of the reflecting surface of the main mirror and that of the sub-mirror according to the seventh embodiment.

A seventh embodiment according to the third approach of the present invention is shown in FIGS. 20 and 21. In the seventh embodiment, both of the reflecting surface $R_1$ of the main mirror $MR_1$ and the reflecting surface $R_2$ of the sub-mirror $MR_2$ are constructed so as to permit transmission of light which is detectable by the focus detection device with reflecting light contributing an exposure of a film. In other words, a coating is applied to both of the reflecting surfaces $R_1$ and $R_2$, which permits the transmission of light within a first predetermined wavelength range but reflects the other light within a second predetermined wavelength range. The film is exposed by the light within the second predetermined wavelength range, and the CCD provided in the focus detection device AFS can detect the light within the first predetermined wavelength range for detecting the focusing condition of the catadioptric lens system. More concretely, both the reflecting surface $R_1$ of the main mirror $MR_1$ and the reflecting surface $R_2$ of the sub-mirror $MR_2$ are coated by a coating which permit the transmission of infrared light but reflects visible light. Therefore, the film can be exposed by the visible light, and the automatic focus detection device receives the infrared light for detecting the focusing condition of the catadioptric lens system, since the CCD provided in the automatic focus detection device has a sensitivity on the infrared light. Furthermore, the sub-mirror $MR_2$ itself is also necessary to be made of a material which permit the transmission of light which is detectable by the focus detection device.

In the seventh embodiment according to the third approach of the present invention, the reflecting surface $R_1$ of the main mirror $MR_1$ is also made of the material described above. This is effective for preventing light from the sub-mirror $MR_2$ from being incident on the CCD, since such light is transmitted through the main mirror $MR_1$. Therefore, it is possible to improve the accuracy of the focus detection by applying the above described material to the reflecting surface $R_1$ of the main mirror $MR_1$. FIG. 9 also represents a catadioptric lens system, according to the third approach of the present invention, mounted on a camera body having a phase difference detection type automatic focus detection device.

An example of the construction of the above described coating is shown in TABLE 4. The coating is constructed by seven (7) layers in which a low refractive layer made of $MgF_2$ and a high refractive layer made of $ZrO_2$ or a mixture of $ZrO_2$ ant $TiO_2$ are located alternatively in turn on a substrate. The seven layers are numbered from the air side to the substrate side, as first layer, second layer, . . . , and seventh layer. Optical thicknesses (Nd) of respective layers are determined on the basis of a predetermined design wavelength so that the spectral characteristic of the whole coating is flat.

TABLE 4

|  | Material | Refractive index (N) | Optical thickness (Nd) |
| --- | --- | --- | --- |
|  | Air | 1.0 |  |
| First layer | $ZrO_2$ | 2.12 | 0.225 |
| Second layer | $MgF_2$ | 1.385 | 0.246 |
| Third layer | $ZrO_2$ | 2.12 | 0.222 |
| Fourth layer | $MgF_2$ | 1.385 | 0.341 |
| Fifth layer | $ZrO_2$ | 2.12 | 0.409 |
| Sixth layer | $MgF_2$ | 1.385 | 0.419 |
| Seventh layer | $ZrO_2$ | 2.12 | 0.438 |
| Substrate | Glass | 1.52 |  |

The spectral characteristic of reflectance of the whole coating shown in TABLE 4 is represented in FIG. 21. In FIG. 21, the vertical axis indicates the reflectance of the coating, and the horizontal axis indicates the wavelength of light incident thereon.

According to the seventh embodiment, the focusing condition of the catadioptric lens system can be detected by the phase difference detection type automatic focus detection device, regardless of the shape of the exit pupil of the catadioptric lens system.

As can be readily appreciated, it is possible to deviate from the embodiments of the present invention and, as will be readily understood by those skilled in the optical ar, the invention is capable of many modifications and improvements within the scope and spirit thereof. Accordingly, it will be understood that the invention is not to be limited by these specific embodiments, but only by the scope and spirit of the appended claims.

What is claimed is:

1. A camera system including a camera body and a catadioptric lens mountable on the camera body, comprising:

means, provided in the camera body, for detecting a focusing condition of a lens mounted on the camera body, by detecting a distance of a pair of secondary images of an image formed by the lens; and means, provided in the catadioptric lens, for determining both an outside diameter of an exit pupil of the catadioptric lens and an inside diameter thereof so that light bundles forming the pair of secondary images are passed through the exit pupil.

2. A camera system as claimed in claim 1, wherein the catadioptric lens includes a catadioptric lens system fulfilling the following conditions:

$5.5 \leq F_{NO(OUT)} \leq 7.5$
$15 \leq F_{NO(IN)} \leq 20$ wherein:

$F_{NO}(OUT)$ represents F-number of the lens system corresponding to the outside shape of the exit pupil; and $F_{NO}(IN)$ represents F-number of the lens system corresponding to the inside shape of the exit pupil.

3. A camera system as claimed in claim 2, wherein the catadioptric lens system further fulfills the following conditions;

$100 \text{ mm} \leq P_{U(OUT)} \leq 150 \text{ mm}$
$100 \text{ mm} \leq P_{U(IN)} \leq 150 \text{ mm}$ wherein:

$P_{U(OUT)}$ represents a distance between a focal plane of the lens system and an intersection on which an optical axis of the lens system intersects a principal ray which passes through an outside edge of the exit pupil to a focal position having an image height of 2.0 mm; and $P_{U(IN)}$ represents a distance between the focal plane of the lens system and an intersection on which the optical axis of the lens system intersects a principal ray which passes through an inside edge of the exit pupil to the focal position having the image height of 2.0 mm.

4. A camera system as claimed in claim 1, wherein the detecting means includes means for forming the pair of secondary images along a predetermined directions, and the determining means includes means for forming the exit pupil of the catadioptric lens so as to be extended along the predetermined direction.

5. A camera system as claimed in claim 4, wherein the determining means includes means for limiting area, through which light bundles forming the pair of secondary images pass, to have a cross-sectional shape extended along the predetermined direction.

6. A camera system as claimed in claim 4, wherein the limiting means includes a light shielding member for preventing harmful light from being incident on the image plane, said light shielding member limiting the area.

7. A camera system as claimed in claim 6, wherein two recesses are provided in the light shielding member along the predetermined direction.

8. A camera system as claimed in claim 6, wherein the light shielding member has a cross-sectional shape extended along the predetermined direction.

9. A catadioptric lens system mountable on the camera body which includes a focus detection device for detecting a focusing condition of a lens mounted on the camera body by detecting a distance of a pair of secondary images of an image formed by the lens along a predetermined direction, comprising:

first means for determining an out side diameter of an exit pupil of the catadioptric lens and second means for determining an inside diameter of an exit pupil so that light bundles forming the pair of secondary images are passed through the resultant exit pupil.

10. A catadioptric lens system as claimed in claim 9, wherein the lens system fulfills the following conditions;

$5.5 \leq F_{NO(OUT)} \leq 7.5$
$15 \leq F_{NO(IN)} \leq 20$ wherein:

$F_{NO(OUT)}$ represents F-number of the lens system corresponding to the outside shape of the exit pupil; and $F_{NO(IN)}$ represents F-number of the lens system corresponding to the inside shape of the exit pupil.

11. A catadioptric lens system as claimed in claim 10, wherein the lens system further fulfills the following conditions;

$100 \text{ mm} \leq P_{U(OUT)} \leq 150 \text{ mm}$
$100 \text{ mm} \leq P_{U(IN)} \leq 150 \text{ mm}$ wherein:

$P_{U(OUT)}$ represents a distance between a focal plane of the lens system and an intersection on which an optical axis of the lens system intersects a principal ray which passes through an outside edge of the exit pupil to a focal position having an image height of 2.0 mm; and $P_{U(IN)}$ represents a distance between the focal plane of the lens system and an intersection on which the optical axis of the lens system intersects a principal ray which passes through an inside edge of the exit pupil to the focal position having the image height of 2.0 mm.

12. A catadioptric lens system as claimed in claim 9, wherein the determining means includes means for forming the first and second exit pupil of the catadioptric lens so as to be extended along the predetermined direction.

13. A catadioptric lens system as claimed in claim 12, wherein the first and second determining means includes means for limiting area, through which light bundles forming the pair of secondary images pass, to have a cross-sectional shape extended along the predetermined direction.

14. A catadioptric lens system as claimed in claim 12, wherein the limiting means includes a light shielding member for preventing harmful light from being incident on the image plane, said light shielding member limiting the area.

15. A catadioptric lens system as claimed in claim 14, wherein two recesses are provided in the light shielding member along the predetermined direction.

16. A catadioptric lens system as claimed in claim 14, wherein the light shielding member has a cross-sectional shape extended along the predetermined direction.

17. A catadioptric lens system mountable on a camera body having a focus detection device for detecting a focusing condition of a mounted lens by receiving light passed through the mounted lens, comprising in the order of the transmission of a light ray in the system:

a main mirror element having a first reflecting surface concave to the object side;

a sub-mirror element having a second reflecting surface convex to the image side; and wherein the second reflecting surface is constructed so as to permit transmission of light detectable by the focus detection device with reflecting light contributing an exposure of a film.

18. A catadioptric lens system as claimed in claim 17, wherein the second reflecting surface includes a substrate and a coating, provided on the substrate, which permits transmission of light detectable by the focus detection device but reflects light contributing an exposure of a film.

19. A catadioptric lens system as claimed in claim 18, wherein the second reflecting surface includes the substrate and a coating, provided on the substrate, which permits transmission of infrared light but reflects visible light.

20. A catadioptric lens system as claimed in claim 17, wherein the second reflecting surface is constructed so as to permit transmission of infrared light with reflecting visible light.

21. A catadioptric lens system as claimed in claim 17, wherein the first reflecting surface is also constructed so as to permit transmission of light detectable by the focus detection device with reflecting light contributing an exposure of a film.

22. A catadioptric lens system as claimed in claim 21, wherein the first reflecting surface includes a substrate and a coating, provided on the substrate, which permits transmission of light detectable by the focus detection device but reflects light contributing an exposure of a film.

23. A catadioptric lens system as claimed in claim 22, wherein the second reflecting surface includes the substrate and a coating, provided on the substrate, which permits transmission of infrared light but reflects visible light.

24. A catadioptric lens system as claimed in claim 21, wherein the first reflecting surface is constructed so as to permit transmission of infrared light with reflecting visible light.

25. A catadioptric lens system as claimed in claim 17, wherein both of the first and second reflecting surface are constructed so as to permit transmission of infrared light with reflecting visible light.

* * * * *